(No Model.)
J. BECHTOLD.
ANIMAL OR OTHER POWER.
No. 384,603. Patented June 19, 1888.
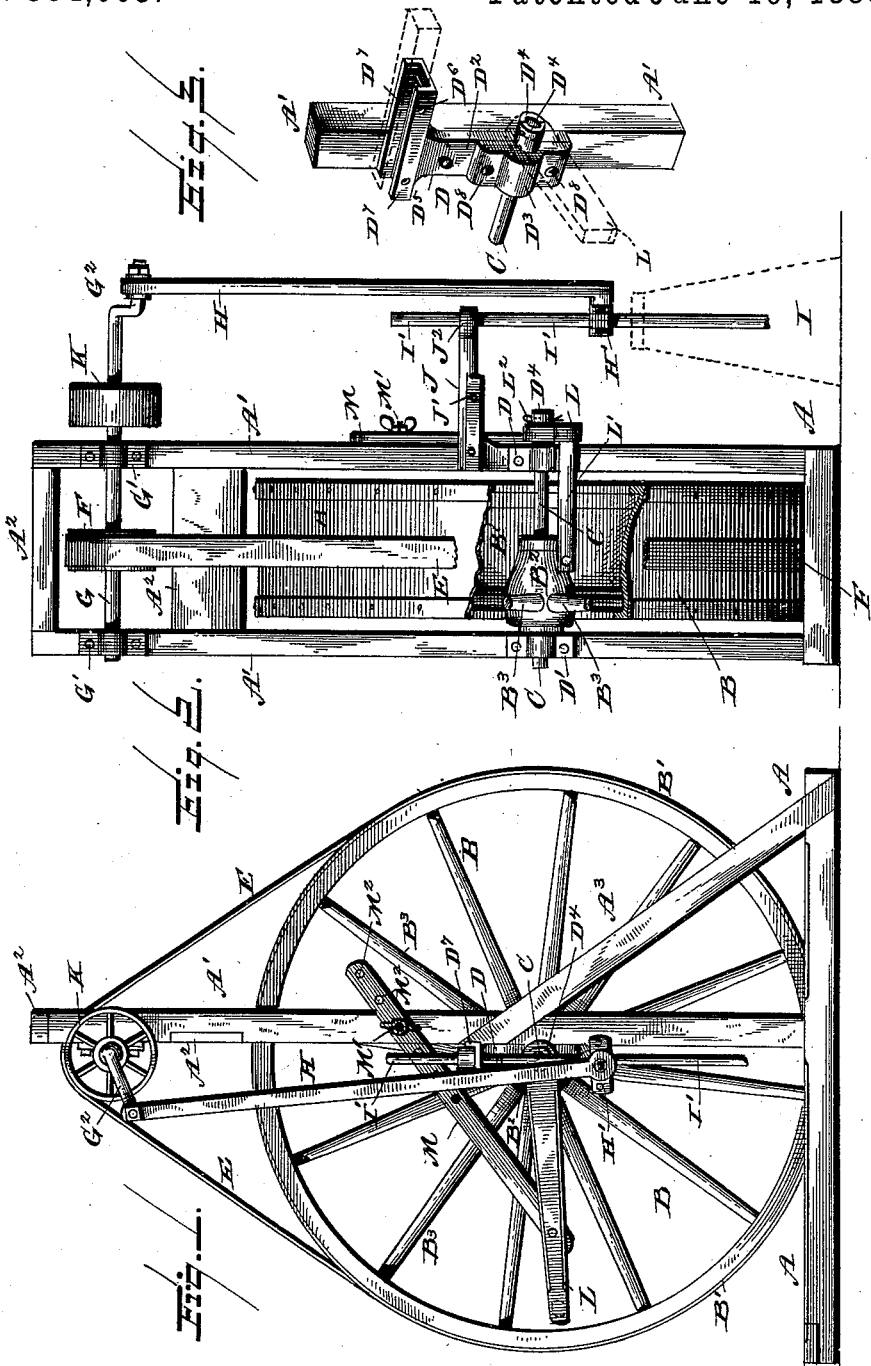
Witnesses.
S. C. Hills,
H. Sutherland.
Inventor,
John Bechtold.
E. B. Stocking
Attorney.

UNITED STATES PATENT OFFICE.

JOHN BECHTOLD, OF HENRYVILLE, INDIANA, ASSIGNOR OF ONE-HALF TO MATHEW H. DUNLEVY, OF SAME PLACE.

ANIMAL OR OTHER POWER.

SPECIFICATION forming part of Letters Patent No. 384,603, dated June 19, 1888.

Application filed October 1, 1887. Serial No. 251,164. (No model.)

*To all whom it may concern:*

Be it known that I, JOHN BECHTOLD, a citizen of the United States, residing at Henryville, in the county of Clarke, State of Indiana, have invented certain new and useful Improvements in Animal or other Powers, of which the following is a specification, reference being had therein to the accompanying drawings.

This invention relates to animal-powers; and it consists of certain features of construction hereinafter described, and particularly pointed out in the claims.

Figure 1 is a side elevation, Fig. 2 an end elevation with portions broken away, and Fig. 3 a detail in perspective, of an animal-power constructed in accordance with my invention.

The object of this invention is to construct a machine of that class which consists of a vertical wheel having a broad rim, within and upon which a dog, sheep, or other animal may travel, so as to give motion to the wheel, and by means of a belt running on the periphery of said wheel, and also on a pulley mounted on a counter-shaft, motion may be conveyed to the churn or any other desired machine suitably connected with the counter-shaft. Upon a suitable base, A, uprights A' are mounted and connected together by cross-bars A². One or more braces, A³, extend from the base to the upright.

B represents the main or driving wheel of the machine, and its rim B' is sufficiently wide to form a track upon which an animal may travel in order to give motion to the wheel. The rim B' is set at one side, or, in other words, the spokes B³ of the wheel are connected with the rim at one edge of the latter, so as to provide an unobstructed track. The hub B² is mounted upon a shaft, C, which runs in bearings D D', secured to the uprights A'. The bearing D is formed of two pieces—the piece D² and the cap D³—each of which is provided with the lateral half-tubular half-bearing or extension D⁴, and the brace is extended upwardly, as at D⁵, and terminates in a bracket, D⁶, having vertical flanges D⁷. The bolts D⁸ serve the purpose of securing the cap and base together and to the upright.

E represents the belt, which runs into contact with the periphery or rim B' of the wheel B and over a pulley, F, mounted upon the counter-shaft G, running in bearings G', secured to the uprights. The counter-shaft terminates in a crank, G², to which there is pivotally connected a rod, H, having at its lower end a clamp, H', by means of which may be operated the dasher-rod I' of a churn, I, (shown in dotted lines,) or it may be the piston-rod of a pump or the principal moving device of any machine.

J represents a guide-rod, secured by screws or bolts J' between the flanges of the bracket D⁶, and having a bearing, J², for the rod I'. When it is desired to communicate a rotary motion from the machine, the pulley K, rigidly mounted on the counter-shaft, is employed in connection with a belt extending to the machine to be operated.

L represents the hitching-bar, having an arm, L', projecting inside of the rim, which construction is possible by reason of the location of the spokes at the opposite edge of the rim. The bar L is pivotally mounted on the tubular extensions D⁴ of the bearing D, and is retained thereon by a pin or bolt, L². An adjusting-arm, M, is pivotally connected to the bar L and removably connected by a thumb nut and bolt, M', to the upright. A series of bolt-holes, M², in the arm M admit of its attachment at different points with the upright.

In use it is apparent that the weight of the animal traveling within and upon the rim is the primary source of power, and that the greater the distance between the lower end of the upright A' and the point at which the animal travels on the rim the greater is the power developed. Now, the halter usually employed being of a given length, the animal may be caused to travel up higher on the rim by adjusting the leading-bar higher up, so that I can adapt my machine to the best advantage as to the weight of the animal intended to operate the same, while by the construction of the bearing D, as shown, simplicity and cheapness of manufacture, as well as rigidity of the parts thereof and of the machine, are secured.

What I claim is—

1. The combination of the wheel B, uprights

A', bearings D D', the latter extended to form the bracket $d^6$, the counter-shaft G, connecting-rod H, guide-rod J, mounted in the bracket, and the rod I', substantially as specified.

2. The combination of the bearing D, having the tubular extensions $D^4$, forming a long bearing for the shaft C, the leading-bar L, mounted on the extension, and the adjusting-arm M, pivotally connected with the leading-bar, substantially as specified.

In testimony whereof I affix my signature in presence of two witnesses.

JOHN BECHTOLD.

Witnesses:
LAURENCE PRALL,
JAMES R. MITCHELL.